United States Patent
Kwon et al.

(10) Patent No.: US 10,403,912 B2
(45) Date of Patent: Sep. 3, 2019

(54) ANODE DISCHARGE VALVE FOR FUEL CELL SYSTEM

(71) Applicant: Hyundai Motor Company, Seoul (KR)

(72) Inventors: Bu Kil Kwon, Gyeonggi-do (KR); Se Kwon Jung, Seoul (KR); Hyun Joon Lee, Gyeonggi-do (KR); Hyo Sub Shim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 311 days.

(21) Appl. No.: 15/268,882

(22) Filed: Sep. 19, 2016

(65) Prior Publication Data
US 2017/0309932 A1  Oct. 26, 2017

(30) Foreign Application Priority Data
Apr. 26, 2016 (KR) .................... 10-2016-0050788

(51) Int. Cl.
| | | |
|---|---|---|
| H01M 8/04 | (2016.01) | |
| H01M 8/04089 | (2016.01) | |
| F16K 17/04 | (2006.01) | |
| H01M 8/04223 | (2016.01) | |
| H01M 8/04082 | (2016.01) | |
| F16K 31/122 | (2006.01) | |
| F16K 31/50 | (2006.01) | |
| F16K 1/04 | (2006.01) | |

(52) U.S. Cl.
CPC .......... *H01M 8/04097* (2013.01); *F16K 1/04* (2013.01); *F16K 17/0486* (2013.01); *F16K 31/1221* (2013.01); *F16K 31/1223* (2013.01); *F16K 31/50* (2013.01); *H01M 8/04201* (2013.01); *H01M 8/04231* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 9,016,319 B2 | 4/2015 | Spahr | |
| 2015/0267836 A1* | 9/2015 | Lee | F16K 31/0686 251/129.07 |

FOREIGN PATENT DOCUMENTS

| | | |
|---|---|---|
| JP | 2006-331781 A | 12/2006 |
| KR | 2011-0062012 A | 6/2011 |
| KR | 10-1519165 B1 | 5/2015 |
| KR | 10-2015-0110201 A | 10/2015 |
| KR | 10-2015-0113398 A | 10/2015 |
| KR | 10-1578778 B1 | 12/2015 |

* cited by examiner

Primary Examiner — Tracy M Dove
(74) Attorney, Agent, or Firm — Mintz Levin Cohn Ferris Glovsky and Popeo, P.C.; Peter F. Corless

(57) ABSTRACT

An anode discharge valve for a fuel cell system includes a valve main body which is installed in a hydrogen recirculation line of a fuel cell stack; a drive shaft which is rotatably installed in the valve main body, and coupled to an opening member which selectively opens a hydrogen discharge port by being rotated; and a mechanism which is connected to a hydrogen inlet port of the valve main body so as to form a hydrogen inflow path, and operates to rotate the drive shaft as a pressure of hydrogen inflowing through the hydrogen inflow path increases.

4 Claims, 7 Drawing Sheets

ANODE DISCHARGE VALVE FOR FUEL CELL SYSTEM

CROSS-REFERENCE TO RELATED APPLICATION

This application claims under 35 U.S.C. § 119(a) the benefit of Korean Patent Application No. 10-2016-0050788 filed on Apr. 26, 2016, the entire contents of which are incorporated herein by reference.

BACKGROUND

(a) Technical Field

The present invention relates to an anode discharge valve for a fuel cell system, more particularly, to an anode discharge valve which has an overpressure prevention function.

(b) Description of the Related Art

In general, a fuel cell system mounted in a fuel cell vehicle includes a fuel supply system which supplies hydrogen (fuel) to a fuel cell stack, an air supply system which supplies the fuel cell stack with oxygen in the air which is an oxidizing agent required for an electrochemical reaction, the fuel cell stack which is made by stacking and coupling a plurality of unit cells so as to generate electricity through an electrochemical reaction between hydrogen and oxygen, and a heat and water management system which removes heat generated by the electrochemical reaction in the fuel cell stack and controls an operating temperature of the fuel cell stack.

An operation of the fuel supply system of the fuel cell system will be described. First, when hydrogen (fuel), which has passed through a high-pressure regulator and a hydrogen supply valve from a hydrogen tank, enters an anode of the fuel cell stack through an ejector that provides injection pressure, and then a reaction for generating electricity is completed, a hydrogen purge is performed in which a part of the hydrogen is recirculated to the anode, and the remaining hydrogen is discharged to a cathode via an anode discharge valve.

That is, a part of the hydrogen, which has been discharged from the fuel cell stack by an operation of a hydrogen recirculation blower at the time of the hydrogen purge, is recirculated to the anode while passing through a hydrogen recirculation line, and the remaining hydrogen is discharged to the cathode while passing through a hydrogen purge line by the anode discharge valve.

Here, an overpressure relief valve, which drops a pressure when overpressure is applied to the fuel cell stack, is installed in the hydrogen purge line together with the anode discharge valve, and the overpressure relief valve discharges gas through the same path as the anode discharge valve, but has a different function, and as a result, the overpressure relief valve needs to be installed in the hydrogen recirculation line separately from the anode discharge valve.

The above information disclosed in this Background section is only for enhancement of understanding of the background of the invention and therefore it may contain information that does not form the prior art that is already known in this country to a person of ordinary skill in the art.

SUMMARY

The present invention provides an anode discharge valve for a fuel cell system, which is provided with a rod that selectively moves in accordance with the occurrence of overpressure, and allows the rod to rotate a rotor of a valve main body in order to open the valve, thereby simultaneously removing overpressure and performing hydrogen purge by using a single valve.

In one aspect, the present invention provides an anode discharge valve for a fuel cell system, the anode discharge valve including: a valve main body which is installed in a hydrogen purge line of a fuel cell stack; a drive shaft which is rotatably installed in the valve main body, and coupled to an opening member which selectively opens a hydrogen discharge port by being rotated; and a mechanism which is connected to a hydrogen inlet port of the valve main body so as to form a hydrogen inflow path, and operates to rotate the drive shaft as a pressure of hydrogen inflowing through the hydrogen inflow path increases.

In a preferred embodiment, the drive shaft may include a guide member which protrudes in a lateral direction so as to abut an end portion of the mechanism and guides a rotation path in accordance with an operation of the mechanism.

In another preferred embodiment, the mechanism may include: a main body portion which forms the hydrogen inflow path; a movable unit which is installed in a movement region connected with the hydrogen inflow path, and slides as the pressure of hydrogen flowing along the hydrogen inflow path increases; and a drive unit which moves along with the sliding movement of the movable unit so as to protrude to the outside of the movement region, and rotates the drive shaft by pressing the guide member.

In still another preferred embodiment, the mechanism may further include an elastic member which is coupled to surround an outer circumferential surface of the drive unit, and provides elastic force in accordance with the sliding movement of the drive unit in the movement region.

In yet another preferred embodiment, the movable unit may include an O-ring member which is provided to seal the interior of the movement region by hydrogen flowing along the hydrogen inflow path.

In still yet another preferred embodiment, the opening member may be thread-coupled to the end portion of the drive shaft, and the drive shaft may be rotated by an operation of the drive unit so as to move the opening member upward or downward and open the hydrogen discharge port.

According to the present invention, the anode discharge valve for a fuel cell system is provided with the rod that selectively moves in accordance with the occurrence of overpressure, and allows the rod to rotate the rotor of the valve main body in order to open the valve, thereby simultaneously removing overpressure and performing hydrogen purge by using the single anode discharge valve.

According to the present invention, since the configuration of the overpressure relief valve is included in the anode discharge valve, it is possible to omit an overpressure relief valve, which is separately installed in the existing hydrogen purge line, thereby reducing costs.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
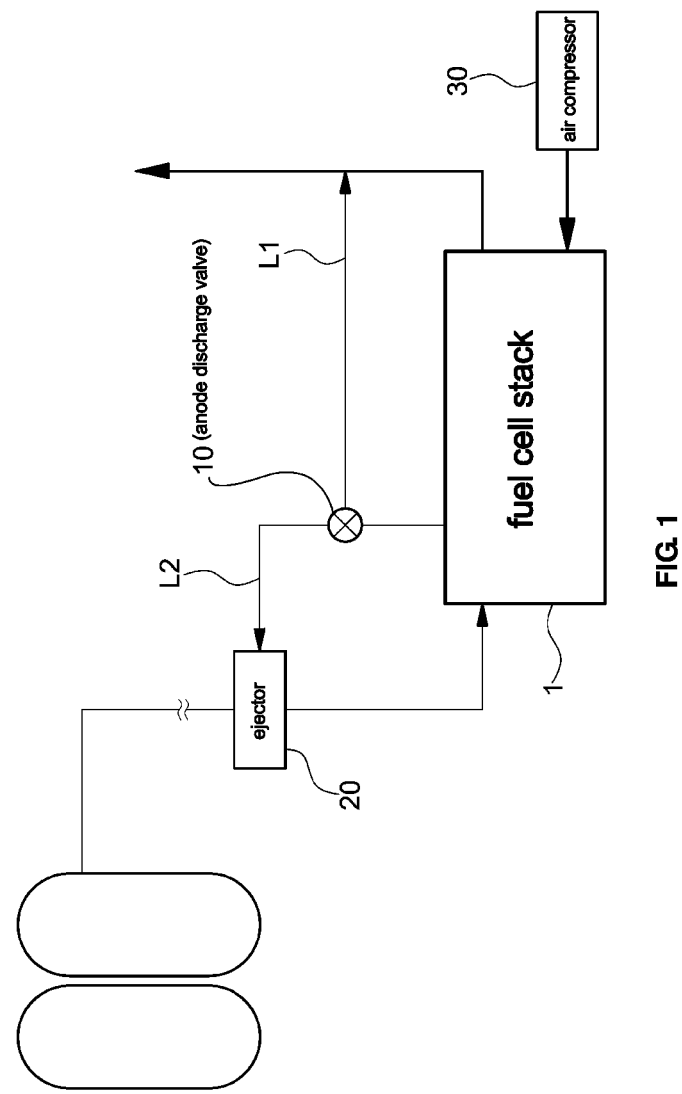
FIG. 1 is a view illustrating a fuel cell system according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Advantages and features of the present invention and methods of achieving the advantages and features will be clear with reference to the exemplary embodiments described in detail below together with the accompanying drawings.

However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims.

In the description of the present invention, a detailed explanation of publicly known related technologies may be omitted so as to avoid unnecessarily obscuring the subject matter of the present invention.

Figure 2:
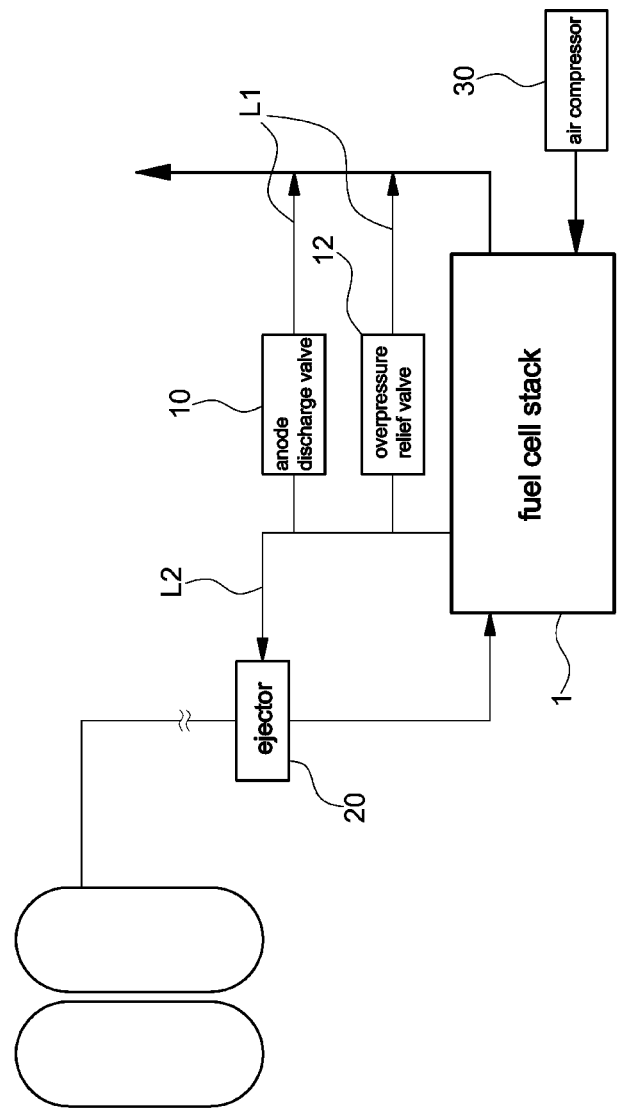
FIG. 2 (RELATED ART) is a view illustrating a fuel cell system of the related art.

FIG. 1 is a view illustrating a fuel cell system according to an exemplary embodiment of the present invention, and FIG. 2 (RELATED ART) is a view illustrating a fuel cell system of the related art.

In general, as shown in FIG. 2, a fuel cell system mounted in a fuel cell vehicle includes a fuel supply system which supplies hydrogen (fuel) to a fuel cell stack 1, an air supply system which supplies, through an air compressor 30, the fuel cell stack 1 with oxygen in the air which is an oxidizing agent required for an electrochemical reaction, and the fuel cell stack 1 which is made by stacking and coupling a plurality of unit cells so as to generate electricity through an electrochemical reaction between hydrogen and oxygen.

Here, an operation of the fuel supply system will be described. When hydrogen (fuel), which has passed through a high-pressure regulator and a hydrogen supply valve from a hydrogen tank, enters an anode of the fuel cell stack 1 through an ejector 20 that provides injection pressure, and then a reaction for generating electricity is completed, a hydrogen purge is performed in which a part of the hydrogen recirculates to the anode, and the remaining hydrogen is discharged to a cathode via an anode discharge valve 10.

That is, a part of the hydrogen, which has been discharged from the fuel cell stack 1 by an operation of a hydrogen recirculation blower at the time of the hydrogen purge, is recirculated to the anode while passing through a hydrogen recirculation line L2, and the remaining hydrogen is discharged to the cathode while passing through a hydrogen purge line L1 by the anode discharge valve 10.

As shown in FIG. 2, an overpressure relief valve 12, which drops a pressure when overpressure is applied to the fuel cell stack 1, is installed in the hydrogen purge line L1 together with the anode discharge valve 10, and the overpressure relief valve 12 discharges gas through the same path as the anode discharge valve 10, but has a different function, and as a result, the overpressure relief valve 12 needs to be installed in the hydrogen purge line L1 separately from the anode discharge valve 10.

In other words, the fuel cell vehicle uses hydrogen fuel, and supplies hydrogen to the fuel cell stack 1 after dropping the pressure of high-pressure (700 bar) hydrogen. Typically, a working pressure of the fuel cell stack 1 is 3 bar or lower.

In the event of abnormality of a pressure adjusting function, a pressure, which is higher than a pressure in a normal state, is formed in the fuel cell stack 1, and in this case, the fuel cell stack 1 may be permanently damaged, and as a result, an overpressure relief valve 12 needs to be applied to the fuel cell vehicle in order to prevent damage to the fuel cell stack 1.

However, in a case in which the anode discharge valve 10 and the overpressure relief valve 12, which discharge hydrogen through the same path, are integrated into a single valve as shown in FIG. 1, advantages such as a reduction in costs and improved package efficiency may be achieved.

Therefore, in the present exemplary embodiment, a function of the overpressure relief valve 12 is included in the anode discharge valve 10, such that it is possible to omit the overpressure relief valve 12 which is typically and separately installed in the hydrogen purge line L1, thus reducing costs.

Figure 3:
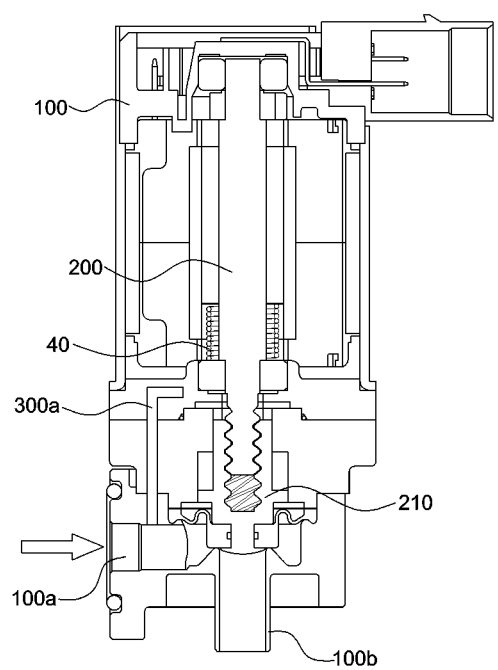
FIG. 3 is a view illustrating a structure of an anode discharge valve of the fuel cell system according to the exemplary embodiment of the present invention.
Figure 4:
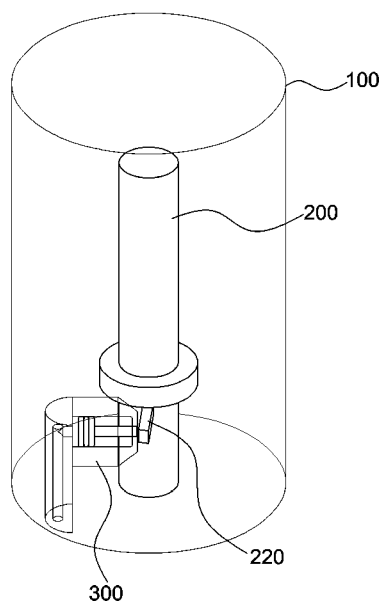
FIG. 4 is a view illustrating a mechanism in a normal state for the anode discharge valve of the fuel cell system according to the exemplary embodiment of the present invention.
Figure 5:
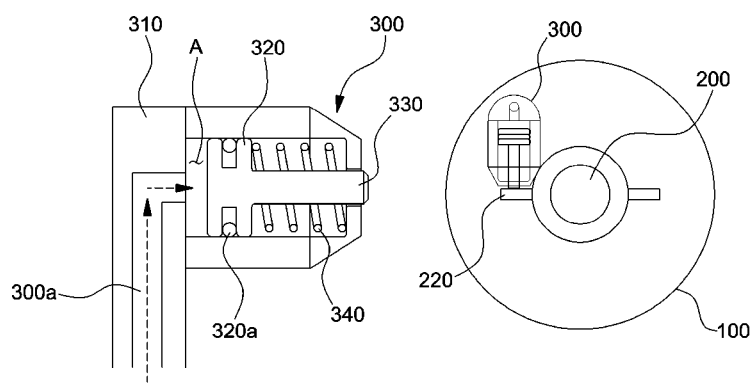
FIG. 5 is a view illustrating an operation of the mechanism in the normal state for the anode discharge valve of the fuel cell system according to the exemplary embodiment of the present invention.

FIG. 3 is a view illustrating a structure of an anode discharge valve of the fuel cell system according to the exemplary embodiment of the present invention, FIG. 4 is a view illustrating a mechanism in a normal state for the anode discharge valve of the fuel cell system according to the exemplary embodiment of the present invention, and FIG. 5 is a view illustrating an operation of the mechanism in the normal state for the anode discharge valve of the fuel cell system according to the exemplary embodiment of the present invention.

As shown in FIG. 3, the anode discharge valve 10 for a fuel cell system includes a valve main body 100, a drive shaft 200, and a mechanism 300.

The valve main body 100 is installed in the hydrogen recirculation line L2 of the fuel cell stack 1.

The drive shaft 200 is rotatably installed in the valve main body 100, and coupled to an opening member 210 which selectively opens a hydrogen discharge port 100b by being rotated.

A torsion spring 40 preferably is installed on an outer circumferential surface of the drive shaft 200, and the torsion spring 40 provides elastic restoring force to the drive shaft 200 so that the drive shaft 200 may return to an initial position when inflow hydrogen is in a normal state in a case in which the drive shaft 200 rotates by an operation of the mechanism 300.

As shown in FIG. 4, the drive shaft 200 includes a guide member 220 that protrudes in a lateral direction so as to abut an end portion of the mechanism 300 and guides a rotation path in accordance with an operation of the mechanism 300.

That is, the anode discharge valve 10 according to the present exemplary embodiment includes the mechanism 300 which is connected to a hydrogen inlet port 100a of the valve main body 100 and forms a hydrogen inflow path 300a, and the mechanism 300 operates as a pressure of hydrogen inflowing through the hydrogen inflow path 300a increases, thereby rotating the drive shaft 200.

To this end, as shown in FIG. 5, the mechanism 300 includes a main body portion 310, a movable unit 320, and a drive unit 330.

The main body portion 310 is installed in the valve main body 100 while having a predetermined length, and connected with the hydrogen inlet port 100a so as to form the hydrogen inflow path 300a in the main body portion 310.

The movable unit 320 is installed in a movement region A connected with the hydrogen inflow path 300a, and may slide in the movement region A as a pressure of hydrogen flowing along the hydrogen inflow path 300a increases.

The movable unit 320 may include an O-ring member 320a in order to seal an interior of the movement region A so that hydrogen flowing along the hydrogen inflow path 300a does not flow into the movement region A.

Therefore, since the movable unit 320 may maintain airtightness in the movement region A so that hydrogen flowing along the hydrogen inflow path 300a does not flow into the movement region A, it is possible to prevent hydrogen from being discharged to the outside of the movement region A.

The drive unit 330 has a predetermined length and is coupled to the movable unit 320, and the drive unit 330 slides along with the sliding movement of the movable unit 320 such that one end portion of the drive unit 330 selectively protrudes to the outside of the movement region A, thereby rotating the drive shaft 200 by pressing the guide member 220.

The mechanism 300 according to the present exemplary embodiment may further include an elastic member 340, and the elastic member 340 is coupled to surround an outer circumferential surface of the drive unit 330, and provides elastic force in accordance with the sliding movement of the drive unit 330 in the movement region A.

That is, the elastic member 340 serves to guide initial positions of the movable unit 320 and the drive unit 330 in the movement region A. If hydrogen inflows in the normal state through the hydrogen inflow path 300a as shown in FIG. 5, a pressure of the inflow hydrogen is lower than elastic force of the elastic member 340, such that the movable unit 320 and the drive unit 330 cannot slide, and the drive shaft 200 cannot be rotated, and as a result, the hydrogen discharge port 100b of the anode discharge valve 10 remains blocked.

Figure 6:
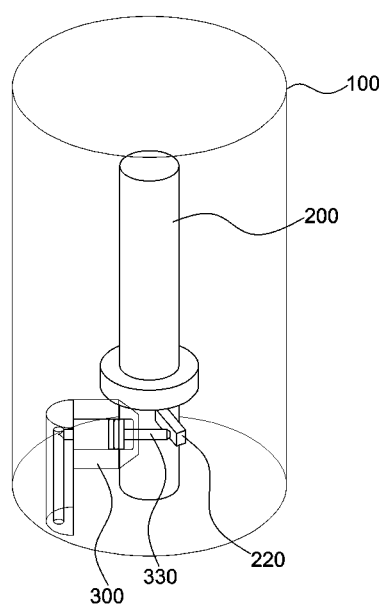
FIG. 6 is a view illustrating the mechanism in an overpressure state for the anode discharge valve of the fuel cell system according to the exemplary embodiment of the present invention.
Figure 7:
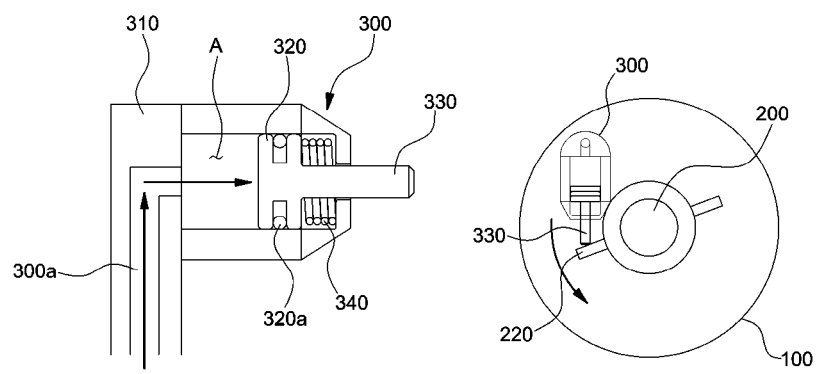
FIG. 7 is a view illustrating an operation of the mechanism in the overpressure state for the anode discharge valve of the fuel cell system according to the exemplary embodiment of the present invention.

FIG. 6 is a view illustrating the mechanism in an overpressure state for the anode discharge valve of the fuel cell system according to the exemplary embodiment of the present invention, and FIG. 7 is a view illustrating an operation of the mechanism in the overpressure state for the anode discharge valve of the fuel cell system according to the exemplary embodiment of the present invention.

As shown in FIGS. 6 and 7, the mechanism 300 moves the movable unit 320 as a pressure of hydrogen inflowing through the hydrogen inflow path 300a increases, and thus may rotate the drive shaft 200 by allowing the drive unit 330 to press the guide member 220.

Because the structure of the mechanism 300 for performing the aforementioned operation has been described in detail with reference to FIGS. 3 to 5, a description thereof will be omitted in the present exemplary embodiment.

Meanwhile, an operation of rotating the drive shaft 200 according to the present exemplary embodiment will be sequentially described. First, when high-pressure hydrogen inflows through the hydrogen inflow path 300a, the movable unit 320 is pushed by overpressure of hydrogen and slides in the movement region A.

Therefore, the drive unit 330 also slides in the movement region A, and one end portion of the drive unit 330 protrudes to the outside of the movement region A and presses the guide member 220.

When the guide member 220 is rotated by being pressed by the drive unit 330 as described above, the drive shaft 220 is also rotated, and the opening member 210 thread-coupled to the end portion of the drive shaft 200 is moved upward or downward.

That is, referring to FIG. 3, the opening member 210 is thread-coupled to the end portion of the drive shaft 200, and if the drive shaft 200 is rotated, the opening member 210 is moved upward or downward by the rotation of the drive shaft 200, thereby opening the hydrogen discharge port 100b of the anode discharge valve 10.

Therefore, according to the present invention, when hydrogen discharged from the fuel cell stack 1 is recirculated along the hydrogen recirculation line L2 due to overpressure, the movable unit 320 and the drive unit 330 slide by overpressure, and therefore, the drive shaft 200 is rotated to open the hydrogen discharge port 100b of the anode discharge valve 10, such that an operation of removing overpressure and an operation of performing hydrogen purge may be simultaneously performed by the single anode discharge valve 10.

According to the present invention, the anode discharge valve for a fuel cell system is provided with the rod that selectively moves in accordance with the occurrence of overpressure, and allows the rod to rotate the rotor of the valve main body in order to open the valve, thereby simultaneously removing overpressure and performing hydrogen purge by using the single anode discharge valve.

According to the present invention, since the configuration of the overpressure relief valve is included in the anode discharge valve, it is possible to omit an overpressure relief valve, which is separately installed in the existing hydrogen recirculation line, thereby reducing costs.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An anode discharge valve for a fuel cell system, comprising:
a valve main body which is installed in a hydrogen recirculation line of a fuel cell stack;
a drive shaft which is rotatably installed in the valve main body, and coupled to an opening member which selectively opens a hydrogen discharge port by being rotated; and
a mechanism which is connected to a hydrogen inlet port of the valve main body so as to form a hydrogen inflow path, and operates to rotate the drive shaft as a pressure of hydrogen inflowing through the hydrogen inflow path increases,
wherein the drive shaft includes a guide member which protrudes in a lateral direction so as to abut an end portion of the mechanism and guides a rotation path in accordance with an operation of the mechanism, and
wherein the mechanism includes:
a main body portion which forms the hydrogen inflow path;
a movable unit which is installed in a movement region connected with the hydrogen inflow path, and slides as the pressure of hydrogen flowing along the hydrogen inflow path increases; and
a drive unit which moves along with the sliding movement of the movable unit so as to protrude to the outside of the movement region, and rotates the drive shaft by pressing the guide member.

2. The anode discharge valve of claim 1, wherein the mechanism further includes an elastic member which is coupled to surround an outer circumferential surface of the drive unit, and provides elastic force in accordance with the sliding movement of the drive unit in the movement region.

3. The anode discharge valve of claim 1, wherein the movable unit includes an O-ring member which is provided to seal an interior of the movement region.

4. The anode discharge valve of claim 1, wherein the opening member is thread-coupled to an end portion of the drive shaft, and the drive shaft is rotated by an operation of the drive unit so as to move the opening member upward or downward and open the hydrogen discharge port.

* * * * *